United States Patent
Xia

(10) Patent No.: US 9,150,942 B2
(45) Date of Patent: Oct. 6, 2015

(54) PROCESS OF LEACHING PRECIOUS METALS

(75) Inventor: Chen Xia, Ottawa (CA)

(73) Assignee: HER MAJESTY THE QUEEN IN RIGHAT OF CANADA AS REPRESENTED BY THE MINISTER OF NATURAL RESOURCES CANADA, Ottawa (CA)

( * ) Notice: Subject to any disclaimer, the term of this patent is extended or adjusted under 35 U.S.C. 154(b) by 0 days.

(21) Appl. No.: 14/239,000

(22) PCT Filed: Aug. 14, 2012

(86) PCT No.: PCT/CA2012/050550
§ 371 (c)(1),
(2), (4) Date: Feb. 14, 2014

(87) PCT Pub. No.: WO2013/023297
PCT Pub. Date: Feb. 21, 2013

(65) Prior Publication Data
US 2014/0212346 A1 Jul. 31, 2014

Related U.S. Application Data

(60) Provisional application No. 61/523,515, filed on Aug. 15, 2011.

(51) Int. Cl.
*C22B 3/00* (2006.01)
*C22B 3/04* (2006.01)

(52) U.S. Cl.
CPC .. *C22B 11/04* (2013.01); *C22B 3/04* (2013.01)

(58) Field of Classification Search
None
See application file for complete search history.

(56) References Cited

U.S. PATENT DOCUMENTS

| 6,660,059 B2 * | 12/2003 | Ji et al. | 75/744 |
| 2002/0092377 A1 * | 7/2002 | Ji et al. | 75/744 |
| 2004/0115108 A1 * | 6/2004 | Hackl et al. | 423/22 |

FOREIGN PATENT DOCUMENTS

| BG | 61002 B | * | 8/1996 |
| CN | 101775490 A | * | 7/2010 |
| WO | 2007/098603 | * | 9/2007 |

OTHER PUBLICATIONS

Xia, C, "Associated sulfide minerals in thiosulfate leaching of gold:problems and solutions" Thesis Submission, Queen's University, Sep. 2008.*
English translation of CN 101775490A, Jul. 2010.*
English translation of BG 61002 B, Aug. 1996.*

* cited by examiner

*Primary Examiner* — Steven Bos
(74) *Attorney, Agent, or Firm* — Cooper & Dunham LLP

(57) ABSTRACT

The invention relates to modifications of a non-ammoniacal thiosulfate process of leaching precious metals (e.g. gold or silver) from precious metal-containing ores. The process involves leaching the ore with an aqueous lixiviant containing a soluble thiosulfate other than ammonium thiosulfate, a copper compound and an organic compound that serves as a copper ligand (i.e. a ligand-forming compound). Four modifications of this process are effective for increasing the amount of precious metal that can be extracted, reducing the consumption of materials, or for improving the rate of extraction. These four process, which may be used singly or in any combination, include (a) additions of soluble lead (e.g. as lead nitrate), (b) additions of thiourea, (c) increases in dissolved oxygen, and (d) increases of temperature at ambient pressure. This avoids the use environmentally harmful chemicals and allows for extraction from a variety of ores, e.g., containing substantial amounts of sulfides and/or quartz.

29 Claims, 4 Drawing Sheets

PROCESS OF LEACHING PRECIOUS METALS

CROSS-REFERENCE TO RELATED APPLICATION

This application is a §371 national stage of PCT International Application No. PCT/CA2012/050550 filed Aug. 14, 2012, claiming the benefit of U.S. provisional application No. 61/523,515 filed Aug. 15, 2011, the entire contents of each of which are hereby incorporated by reference into this application in its entirety.

TECHNICAL FIELD

The present invention relates to processes of leaching and recovering precious metals from materials containing quantities of such metals, e.g. metal ores, waste industrial and consumer products, and the like. More particularly, the invention relates to processes for leaching and recovering such metals, especially gold and/or silver, in an environmentally-friendly manner.

BACKGROUND ART

A traditional way of extracting gold from crushed ores has involved leaching the ores with cyanide, followed by recovery of the gold from the leachate solutions, often by absorption of the gold on activated carbon. The cyanide converts gold to a water-soluble coordination complex which can be leached from the matrix and separated from the residual solid ore. Copper, zinc and silver can be extracted in the same way, and are often present in the same ore bodies as gold. Unfortunately, cyanide is highly poisonous to most life forms and the cyanide process has consequently become very controversial and its use has been criticized or restricted in a number of countries, states and territories. The cyanide process also encounters a number of difficulties when used for the treatment of copper-bearing precious metal ores. The dissolution and oxidation of copper minerals that take place when such ores are subjected to the conventional leaching process consume larger quantities of cyanide and oxygen, reduce precious metal extraction yields and cause problematic precious metal recovery due to dissolved copper species.

An alternative to the cyanide process, which is more effective for ores with high copper values, involves the use of ammoniacal thiosulfate as a lixiviant for the precious metals. Thiosulfate forms a strong complex with gold (I) ions, i.e. $[Au(S_2O_3)_2]^{3-}$, and with ions of other precious metals. An advantage of this approach is that thiosulfate is essentially non-toxic, but unfortunately ammonia is also required to avoid passivation of the precious metals, to stabilize copper (II) and to increase the rate of precious metal dissolution. The use of high volumes of ammonia ensures a high leaching rate, but also makes the process less desirable for several reasons. For example, (a) ammonia is toxic to humans (when exposed to ammonia fumes), and especially to aquatic life when in solution; (b) ammonia is difficult to handle, transport and store; (c) the presence of ammonia increases the consumption or oxidation of the thiosulfate; (d) gold extraction rates may be reduced in the presence of some sulfide minerals; and (e) copper is still often not stable in ammonia-thiosulfate solution. For these reasons, alternatives to the use of ammonia in the thiosulfate leaching process have been investigated.

A number of methods have been attempted to overcome the problems of the ammoniacal thiosulfate leaching process. For example, one method involves the use of certain compounds, e.g. ethylenediaminetetraacetic acid (EDTA), to assist the leaching process. Another involves the use of deoxygenating conditions during thiosulfate leaching. However, all these methods still require the use of free ammonia to perform efficiently.

There are a few known thiosulfate processes that do not need ammonia, e.g. the process of U.S. Pat. No. 6,660,059 which issued to Ji et al. on Dec. 9, 2003. This process employs lixiviants that include at most only small amounts of copper and/or ammonia. To reach an acceptable leaching rate, this process needs to be conducted under conditions of high temperature and pressure.

In a paper presented at the XXIV International Mineral Processing Congress, in Beijing, China held on Sep. 24-28, 2008 (and published in the Proceedings of the meeting), W. T. Yen and C. Xia disclosed a leaching process employing a copper ligand such as EDA or DETA. These processes work with or without the presence of ammonia or ammonium.

However, the attempts made so far have not overcome all of the problems and further improvements are required. In particular, sodium thiosulfate leaching of highly sulphidic gold ores can be difficult due to the detrimental effects of some sulphides. Furthermore, sodium thiosulfate leaching processes appear to be slower than the cyanidation and the ammoniacal thiosulfate leaching processes.

SUMMARY OF THE INVENTION

Exemplary embodiments of the present invention are based on the finding that the use of added ammonia, and of course the use of cyanide, may be avoided for leaching precious metals, particularly gold, by means of one or a combination of several modifications of a non-ammoniacal thiosulfate leaching process. These modifications, used separately or in any combination, involve the addition of dissolvable lead species, the use of thiourea as a secondary lixiviant, increasing the rate or concentration of dissolved oxygen, and the use of mildly increased temperatures at ambient (i.e. not elevated) pressures, preferably at one atmosphere of pressure. These modifications increase and/or accelerate the rate of precious metal extraction without causing significant disadvantages, such as undue consumption of reagents or the generation of a toxic environment.

Thus, a first exemplary embodiment of the invention provides a method of extracting one or more precious metals from a material (e.g. an ore) containing such metal(s), comprising the steps of leaching a precious metal-containing material with a cyanide-free and substantially ammonia-free aqueous lixiviant containing dissolved thiosulfate, copper, a soluble lead compound, e.g. lead nitrate, and an organic compound that serves as a copper ligand (e.g. a polyamine compound), thereby to form a leachate, and then extracting the precious metal from the leachate.

A second exemplary embodiment of the invention provides a method of extracting at least one precious metal from a material (e.g. an ore) containing such metal(s), comprising the steps of leaching a precious metal-containing material with a cyanide-free and substantially ammonia-free aqueous lixiviant containing dissolved thiosulfate, copper, thiourea and an organic compound that serves as a copper ligand (e.g. a polyamine compound), thereby to form a leachate, and then extracting the precious metal from the leachate.

A third exemplary embodiment of the invention provides a method of extracting at least one precious metal from a material (e.g. an ore) containing such metal(s), comprising the steps of leaching a precious metal-containing material with a cyanide-free and substantially ammonia-free aqueous lixiviant containing dissolved thiosulfate, copper and an organic compound that serves as a copper ligand, thereby to form a leachate, and then extracting the precious metal from the leachate, wherein the lixiviant is provided with a dissolved oxygen content above the natural level caused by air-liquid interchange under open air conditions.

A fourth exemplary embodiment of the invention provides a method of extracting at least one precious metal from a material (e.g. an ore) containing such metal(s), comprising the steps of leaching a precious metal-containing material with a cyanide-free and substantially ammonia-free aqueous lixiviant containing dissolved thiosulfate, copper, and an organic compound (e.g. a polyamine compound) that serves as a copper ligand, thereby to form a leachate, and then extracting the precious metal from the leachate, wherein the leaching step is carried out at a temperature above ambient up to the boiling point of the lixiviant. Therefore, in one form, the leaching step is carried out at a temperature in a range of 10 to 100° C., in another form at a temperature in a range of 20 to 70° C., and in yet another form, at a temperature in a range of 30 to 50° C.) under ambient atmospheric conditions (e.g. at or around one atmosphere of pressure). In another form of the invention, the temperature is selected from a range in which the lower temperature is one of 20, 25, 30 or 35° C. and the upper temperature is any higher temperature up to the boiling point of the lixiviant.

Examples of suitable organic compounds that serve as copper ligands include polyamines, amino acids, ethanol amines and other organic compound families that have amino group(s) that can serves as copper ligands. Preferably, the compounds are selected from ethylenediamene (EDA), diethylenetriamine (DETA), triethylenetetramine (TETA), methanolamine (MEA), and glycine. Most preferably, the compound is diethylenetriamine (DETA).

In all of these methods, the metal-containing material is preferably comminuted before the leaching step, but so-called heap leaching may alternatively be carried out whereby a heap of the material is drip treated without pre-grinding or pre-preparation.

In one form of the invention, it is found advantageous to employ a non-ammoniacal thiosulfate-based lixiviant containing a soluble lead compound (e.g. lead nitrate) at an elevated temperature of 50° C. or higher.

The above modifications of the basic thiosulfate leaching process may have some or all of the following advantages, at least in some exemplary embodiments:
  Reduced thiosulfate consumption (compared with an ammoniacal thiosulfate process).
  Leachates are easier to treat in a resin exchange gold recovery process (compared with those from an ammoniacal thiosulfate process).
  The processes may avoid the use of added ammonia (trace amounts of ammonia may be present from the material to be leached).
  The processes need only ambient or mildly elevated temperatures and ambient pressure.
  Unexpectedly, in most cases, it is found that there is no need to control the pH of the lixiviant over a narrow range (e.g. by the addition of acid or base), and often no need to control pH at all. The pH tends to stabilize to a value around about pH 8 after a short time and then maintains this value throughout. The process can therefore be carried out without pH control or buffering.
  The process produces lixiviant solutions in which the copper is quite stable.
  The process is particularly suited for extracting precious metals from sulfidic ores, but may be used on other ores or other materials containing amounts of precious metals, e.g. waste materials from the electronics or recycling industries.

BRIEF DESCRIPTION OF THE DRAWINGS

A detailed description of the exemplary embodiments is provided below with reference to the accompanying drawings, in which.

DETAILED DESCRIPTION

Figure 1:
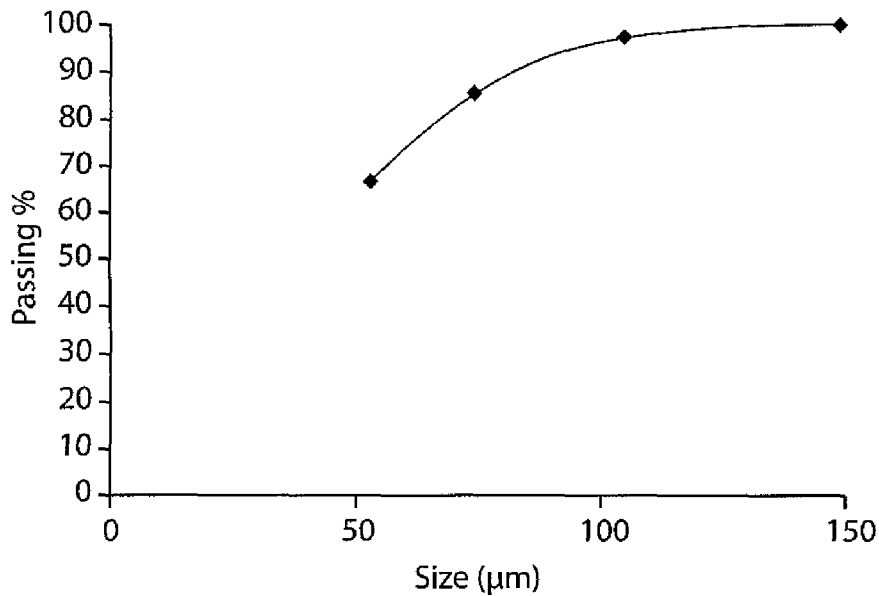
FIG. 1 is a graph showing a size distribution curve of ore particles used in the Example set out below.

For the purposes of the following description, the precious metal to be extracted and recovered is considered to be gold. It should be kept in mind, however, that other exemplary embodiments of the invention may be used for the extraction of other precious metals, particularly silver, either in combination with gold or separately.

The exemplary embodiments of the present invention relate to modifications or variations of a basic (non-ammoniacal) thiosulfate leaching process. Details of the basic thiosulfate process are provided first so that the modifications or variations will become clearly apparent.

This basic thiosulfate process involves leaching an ore or other material containing one or more precious metals, e.g. gold and/or silver. The process may be carried out in commonly available equipment, e.g. mill equipment typically used for the known cyanidation process. The ore is preferably first crushed or comminuted to form smaller particles suitable for the extraction. The process then involves the use of an aqueous lixiviant for leaching the precious metal(s) from the material. The lixiviant contains a soluble thiosulfate other than ammonium thiosulfate, a copper compound (that may be derived from the ore itself as leaching proceeds), an organic compound that serves as a copper ligand, e.g. a compound selected from the group consisting of ethylenediamine (EDA), diethylenetriamine (DETA), triethylenetetramine (TETA), methanolamine (MEA), and glycine. The use of both cyanide and ammonia are avoided in the lixiviant solution, so there is no, or substantially no, content of these chemicals. Without wishing to be limited to a particular theory, it is believed that the copper and ligand-forming compound combination is believed to act as a catalyst for the reaction of gold (or other precious metal) with the thiosulfate ions. The basic reaction leaching step is carried out at ambient temperature (generally less than 10° C. in most extraction facilities) and at ambient pressure (approximately 1 atmosphere) in contact with atmospheric air. After a suitable period of time (e.g. up to 96 hours or when sufficient extraction is deemed to have taken place), during which period the lixiviant and ore particles are maintained in contact, the leachate is separated from the ore residue and gold (or other precious metal) is extracted from the leachate by a suitable known process, e.g. a process involving the use of ion-exchange resins.

The size of the particles formed by the comminution step may vary widely depending on the optimum economics of the extraction process, given that, as the particle size decreases, the rates of extraction increase, but the comminution times and costs generally increase. As an example, for an agitated extraction, the particles may be of such a size that at least about 80% have a size (diameter) smaller than 74 µm. As noted above, prior comminution is preferred but not essential, as the process may alternatively be carried out using heap leaching techniques.

The thiosulfate used in the process may generally be any thiosulfate salt that is economically available other than ammonium thiosulfate. The amount used in the lixiviant solution may be, for example, in the range of 10-500 mM.

As noted above, the ligand-forming compound may be, for example, a compounds selected from ethylenediamine (EDA), diethylenetriamine (DETA), triethylenetetramine (TETA), methanolamine (MEA), and glycine. The ligand-forming compound is normally used at a concentration in the range of 0.05 mmol/L to 1000 mmol/L, and preferably 0.1 to 100 mmol/L.

When copper is added (i.e. when it is not fully derived from the ore or waste material itself), it is preferably added as a soluble copper salt, preferably in an amount in the range of 0.05 to 50 mM. Dissolvable copper compounds include almost all of the common the copper reagents, e.g. copper sulphate, copper chlorite, and many copper minerals that are dissolvable in the solution, e.g., chalcopyrite, chalcocite, bornite, etc. The charge state of the copper in such compounds can be either two or one.

The lixiviant solution and solid particles may be agitated within a suitable mixer or shaker apparatus, or may be subjected to heap leaching using gravity to bring the particles and solution into mutual contact for a required period of time. The contact, whether involving agitation or heap leaching, is generally carried out in the open air and so may be subject to some natural oxygen-liquid exchange.

The pH of the lixiviant solution may, for example, be in a range of pH 5-14, and may be either self-buffered (controlled by the lixiviant itself) or buffered by the addition of alkali, e.g. to adjust the pH to above 10. A final ore/leachate separation step may be carried out in any suitable way, e.g. by decanting, filtration, etc.

The recovery of the precious metals, such as gold, from the leachate can be realized by any suitable method, e.g. cementation, carbon adsorption, resin ion exchange, chemical reduction, and solvent extraction processes. Cementation uses metal powders to reduce gold and cause it to precipitate. After filtration, the precious metals are collected together with the metal power that is used in the process. Some copper will also precipitate with the gold. Carbon adsorption may be used, but often does not work too well for the thiosulfate process. Resin exchange employs resin beads to adsorb gold out of the solution phase. The beads are then collected and subjected to a stripping process for dissolving the gold from the beads into solution. From this solution, the gold can be converted to metal via an electro-winning process or other processes. Chemical reduction processes use sulfide ($S^{2-}$) or $Fe^{2+}$ ion to reduce the gold to its elemental form. The gold metal grains can then be precipitated or co-precipitated. After filtration, the precipitate is collected. Some copper may follow gold into the product, but can be removed by various chemical methods. At present, the best options for recovery of the gold may be the processes using resins and chemical reduction.

The above process is effective for leaching precious metals from ores, including ores containing sulfides and/or quartz, but does not achieve desirably high extraction rates and requires fairly long extraction times. When the term "basic thiosulfate leaching process" or "basic process" is mentioned in the following description, the aforementioned process is implied as a comparison or starting point for the exemplary embodiments described below.

The exemplary embodiments of the present invention can improve the precious metal extraction rates and/or reduce the extraction times of the basic thiosulfate leaching process. Four ways of achieving these results have been identified, and these four ways may be employed singly or in any combination. Particular combinations of features have been found to be especially effective.

Briefly stated, the four ways of modifying the basic thiosulfate leaching process involve (a) adding soluble lead (e.g. lead nitrate), (b) using thiourea as a co-lixiviant, (c) elevating the reaction temperature, and (d) injecting increased levels of oxygen.

In the following, reference is made to gold as the precious metal to be extracted, but it should be kept in mind that the exemplary embodiments may be used in the same way for extracting other precious metals or combinations of such metals.

Additions of Lead

The effectiveness of additions of lead is particularly unexpected because, in the past, it was considered that lead would passivate the gold and prevent leaching of the gold in the basic thiosulfate leaching process, or that at least any benefit would be insignificant. However, it has been shown that lead additions can cause a significant increase in the yield of extracted gold. For example, the addition of lead nitrate was found to increase gold extraction over 96 hours to above 81%.

There are several lead compounds that dissolve in thiosulfate solution, e.g. PbO, PbS, $Pb(NO_3)_2$, etc. The amount required may vary depending on the contents of sulphide in the ore and also on the percentage of carbonate minerals. In general, however, a range of 0.01 to 10 mM, and more preferably 0.1 to 5 mM, is usually effective. The actual concentration for each case may be obtained through trial and experimentation. Lead additions higher than those needed for the desired effect are not preferred because of the increased cost and environmental concerns. The stated concentration of lead in the lixiviant may be present at any point within the leaching step, but is generally the concentration in the lixiviant at the start of the leaching step. However, lead present in the material may dissolve during the leaching step and provide some or all of the desired lead concentration. Dissolvable lead minerals, e.g. PbO and PbS, do not always occur in precious metal ores, so additions of extrinsic lead are normally required.

Additions of Thiourea

Further improvement of the leaching kinetics of the basic process may be realized by adding small amounts of thiourea to the thiosulfate leaching solution (or separately to the metal-containing material). The effectiveness of such additions is surprising because thiourea is not generally considered to be stable and effective at high pH values (i.e. above pH 7). Also, thiourea tends to react with copper and the copper can accelerate the oxidation of thiourea.

While the amount of thiourea that may be added can vary, a concentration range of 5 mM to 300 mM, and more preferably 5 to 100 mM, is effective in most cases. To minimize additional costs, an even more preferred range is 5-50 mM. While thioura is much more expensive and more toxic than thiosulfate, the purpose in these exemplary embodiments is to use it as a secondary lixiviant rather than as the main leaching agent (which is the thiosulfate). It is therefore preferably used in the lowest concentration that provides a significant increase of the extraction yield.

As the leaching solution is normally recycled, only a small percentage of residual thiourea will have to be discharged, e.g. into tailing ponds. If necessary from the point of view of environmental concerns, bacteria that consume thiourea and other chemicals (e.g. thiosulfate and amines) may be introduced to such ponds for further reducing the concentrations of such chemicals.

Increasing the Dissolved Oxygen Concentration

As noted above, it has been found that increasing the dissolved oxygen concentration of the leaching solution increases the yield of extraction compared to the basic process. This can be achieved by adding oxygen, air, an oxygen-rich gas, or oxygen-generating chemicals (e.g. $H_2O_2$), or the like, to the leaching solution, and the oxygen concentration may be measured by means of a standard $O_2$ meter. Since the basic process is normally carried out in the open air, the solution will naturally contain dissolved oxygen by reason of air-liquid exchange under open air conditions, but the oxygen concentration reaches a certain "normal" or "natural" limit. This "normal" limit may vary with the specifics of the extraction process. For example, if the extraction mixture contains sulphides or other oxygen-consuming minerals, the "normal" dissolved oxygen level may be very low (e.g. down to about 0.1 ppm or less). The oxygen level also varies with other parameters, e.g. location, temperature, etc. The fact that increasing the oxygen concentration above the "normal" level improves the extraction yield is unexpected because, in the ammoniacal thiosulfate leaching processes, it was found necessary in some cases in the past to reduce the oxygen content below "normal" levels to ensure low reagent consumption and high precious metal extraction. However, in comparison with the ammoniacal thiosulfate leaching processes, it has been found that the consumption of reagents is not significantly increased by an increase of oxygen above the "normal" levels, whereas the rate of gold extraction is increased. It seems that any amount of oxygen increase above the "normal" level in any particular case improves the extraction yield, so a particular range of values need not be given (although an increase above 9 ppm and more especially above 12.5 ppm is desirable in many cases). Additions of oxygen by the means indicated above are preferably carried out continuously throughout the extraction process, although additions of oxygen just in the initial part of the extraction may be sufficient.

Raising the Extraction Temperature

While the basic extraction is carried out at ambient temperature (generally below 10° C. in ore extraction facilities) it has been found that raising the slurry temperature above ambient produces a significant improvement to the extraction yield. For example, at temperatures at or above about 50° C., the gold extraction rate in some tests reached 90.8% and 84.6% at 24 and 48 hours, respectively.

The effectiveness of elevated temperature in the extraction process is unexpected because, in the ammoniacal thiosulfate extraction process, elevated temperature was in the past found to evaporate the ammonia at a rapid rate, so the use of elevated temperature was considered to be unhelpful. Moreover, in many discussions of such extraction processes in the literature, the effect of elevating temperature was regarded as either negative or unclear. However, in the exemplary embodiments of the invention, it has been unexpectedly found that elevated temperature does not produce any undesirable evaporation or other adverse issues, but increases the rate of precious metal extraction.

The exact temperature range required for significant increases in extraction rate or yield vary with the specifics of each extraction process, but in general it is possible to say that any increase in temperature above ambient produces an increase, and those at or above 50° C. are most effective. Considering the additional cost, the upper limit of the elevated temperature is the boiling point of the extraction solution at ambient pressure.

The temperature of a comminuted ore and slurry often depends on the local climate and weather conditions, i.e. on the ambient air temperatures. Sometimes, the temperature of the comminuted ore depends on its mineral composition because some minerals can generate heat by themselves (e.g., sulphide minerals may be a source of heat under strongly oxidative conditions). The temperature of the ore may also depend on the grinding energy input because, sometimes, grinding can generate significant sensible heat. These considerations, as well as the time between grinding and extraction that may allow for cooling, may give the slurry of ore and lixiviant a "natural" temperature during the extraction above the ambient air and lixiviant temperature achieved without providing an external or exogenous source of heat. In some cases, the "natural" temperature may approach 20 or even 25° C., while in other cases the "natural" temperature is much the same as ambient air and lixiviant temperature (e.g. often less than 10° C.). For embodiments having a higher "natural" temperature of extraction, an increase above this natural temperature is considered "elevated" and provides the desirable yield improvement of this embodiment. While the temperature could be elevated even above the normal boiling point of the extraction solution by carrying out the extraction in an autoclave that allows the pressure to increase, this is not desirable because of the additional costs of equipment, maintenance and processing consequently required.

The temperature elevation is brought about by introducing heat into the system from external or exogenous means by heating the ore, the lixiviant or the slurry of both ore and lixiviant. This can be done by the use of convention heating equipment, e.g. heat exchangers, heated containment vessels, and the like. However, plant may be designed to use waste heat from buildings or industrial processes to heat the extraction solution, or to use natural thermal water sources in the vicinity (for example, some mines have natural thermal water coming out of the ground which can provide a free source of heat). Furthermore, some mines employ heat-generating ore pre-treatment steps (e.g. bio-leaching, autoclave oxidation, roasting, oxidative pre-leach, and so on), and the heat generated in these pre-treatment steps can be used in the leaching step for heating the slurry over and above any heat generated naturally, i.e. without such pre-treatments.

A temperature range employed in one embodiment is 10 to 100° C. (before boiling), more preferably ambient temperature to 90° C. or below, and even more preferably ambient to 80° C. or below. Typically, a range of 20° C.-70° C., more preferably 30° C.-50° C., is an effective range in most cases.

It has been found that the use of elevated temperatures is particularly effective when the "specific surface" of the gold in the material from which it is to be extracted is low because a low specific surface means a slower leaching rate whereas an increased temperature increases the rate of extraction.

The increased temperature does not have to be used throughout the entirety of the extraction process. For example, ore may be leached at ambient temperature at the beginning of the process and, after a few hours or a few days when the reactions slow down, the slurry of ore and extraction solution may be heated to extract residual precious metal more quickly. Such an operating strategy can save energy and reagents as well.

In summary, elevated temperatures can be realized by heating the ore, the extraction solution and/or slurry with any kind of heat source, preferably using heat exchange arrangements to save the heat, recycle the energy and to reduce the consumption of reagents.

In some of these exemplary embodiments, the consumption of sodium thiosulfate was higher than in the basic sodium thiosulfate leaching process. However, the consumption rates were still much lower than in the known ammoniacal thiosulfate leaching processes.

The findings described above are illustrated by the following Examples. The Examples are illustrative of the exemplary embodiments of the present invention, but should not be considered to be limiting as to the scope thereof.

Example 1

An ore sample used for this Example was a Cu/Pb/Zn-bearing sulphidic gold ore designated as "AEY" from Agnico-Eagle's Laronde mine. The mineralogical analysis showed that this sample contained 62.1% pyrite as the most abundant sulphide mineral. Chalcopyrite, pyrrhotite, galena and sphalerite were also found in this ore (see Table 1 below for full list of ore contents). Fire assays of the head sample indicated that there was an average of 1.4 g/t of gold in this sample.

TABLE 1

Mineral Composition of Tested Ore

| Mineral | Wt % |
|---|---|
| Albite | 3.3 |
| Amphibole | 0.1 |
| Apatite | 0.03 |
| Arsenopyrite | 0.03 |
| Biotite | 2.6 |
| Calcite | 0.03 |
| Chalcopyrite | 0.1 |
| Chlorite | 0.2 |

TABLE 1-continued

Mineral Composition of Tested Ore

| Mineral | Wt % |
|---|---|
| Epidote | 0.4 |
| Fe-Cralloy | 0.1 |
| Ferrohornblende | 1.3 |
| Galena | 0.6 |
| Illite | 3.7 |
| Ilmenite | 0.01 |
| Magnetite | 0.04 |
| Muscovite | 2.1 |
| Orthoclase | 0.3 |
| Pagioclase | 1.7 |
| Pyrite | 62.1 |
| Pyrrhotite | 3.7 |
| Quartz | 8.4 |
| Sphalerite | 8.8 |
| Tetrahedrite-tennantite | 0.1 |
| Titanite | 0.1 |
| Total | 100 |

In this Example, both the basic sodium thiosulfate leaching process (no ammonia) and the enhanced sodium thiosulfate leaching processes (no ammonia, but additions and/or modifications as indicated above) were tested on this ore, as follows. Processes of cyanidation and ammoniacal thiosulfate extraction were also carried out on the same ore for reference.

The sample ore was divided evenly into several lots, each weighing about 1.6 kg. Each lot was then mixed with 840 mL water and ground in a rod mill using stainless steel rods for 13 minutes. The particle size reduced from a top size of about 2 mm (100%-10 mesh) to about 85.8% passing 74 microns (−200 mesh). The wet-screen size distribution data is shown in Table 2 and FIG. 1 of the accompanying drawings.

TABLE 2

Size Distribution of Ground Ore Sample

| Size (micron, μm) | Mesh | % passing |
|---|---|---|
| 149 | 100 | 99.90 |
| 105 | 140 | 97.82 |
| 74 | 200 | 85.76 |
| 53 | 270 | 67.07 |

The ground sample slurry was sealed in a glass jar that was filled with water, and then stored at 20 to 23° C. in a dark indoor cabinet. The reagents and chemicals used in this work are listed in Table 3 below. Cyanide and $Ca(OH)_2$ were added in their powder forms. The other chemicals were added as solutions of appropriate concentrations.

TABLE 3

Chemicals and Reagents

| Formula | Names | Abbreviations | Purity |
|---|---|---|---|
| $Na_2S_2O_3 \cdot 5H_2O$ | sodium thiosulfate pentahydrate | STS | 100.2% |
| $(NH_4)_2S_2O_3$ | ammonium thiosulfate | ATS | 99% |
| $Na_2CO_3$ | sodium carbonate, soda ash | | 99.9% |
| NaOH | sodium hydroxide | | 98.7% |
| $Ca(OH)_2$ | calcium hydroxide | | 99% |
| $CS(NH_2)_2$ | thiourea | TU | 99% |
| KI | potassium iodide | | 99% |
| $I_2$ | Iodine | | 99.8% |

TABLE 3-continued

Chemicals and Reagents

| Formula | Names | Abbreviations | Purity |
|---|---|---|---|
| $CuSO_4 \cdot 5H_2O$ | copper sulfate pentahydrate | CS | 99% |
| $PbNO_3$ | lead nitrate | LN | 99.6% |
| $Na_4EDTA$ | tetrasodium ethylenediaminetetraacetic | | 98% |
| $AgNO_3$ | silver nitrate | SN | 99% |
| $H_2SO_4$ | sulfuric acid | SA | 95% |
| $NH_3$, $(NH_4OH)$ | ammonia, ammonium hydroxide | AM, AH | 28-30% |
| $C_2H_4(NH_2)_2$ | ethylenediamine | EDA, en | 99% |
| $CH_3COOH$ | acetic acid | HAC | 0.1N |
| $C_2H_7NO$ | methanolamine, ethanolamine, monoethanolamine | MEA, ETA | 99% |
| $C_4H_{13}N_3$ | diethylenetriamine | DETA, dien | 99% |
| $C_6H_{18}N_4$ | triethylenetetramine | TETA, trien | 60% |
| NaCN | sodium cyanide | cyanide | 95% |

A glass reactor used for the leaching test was placed in a water bath for controlling the reaction temperature within ±0.5° C. Sufficient agitation power was provided through a Teflon® stirrer connected to an overhead mixer. The acceptable agitation speed for this ore was between 400 rpm and 450 rpm. The pulp density was adjusted to approximately 40% solid before the leaching step (330 grams solid with 500 mL solution).

To compensate for the evaporation loss of water, the weight of slurry was adjusted back to a normal level at each control point by adding more water. Slurry pH, dissolved oxygen concentration, thiosulfate concentration, cyanide concentration and reaction temperature were monitored during the tests. A modified iodine/iodide titration method was used in this work to analyze the concentration of thiosulfate on a real-time basis. Cyanide concentration was determined with silver nitrate titration. The reagent concentration and slurry pH were adjusted if required at each control point. Each time, a small portion of slurry was taken and filtered to collect 10 mL of pregnant solution sample. These samples were then sent to an external commercial laboratory for gold assays.

At the end of each test, the whole slurry was filtered. The filter cake was washed twice and dried in an oven. Two representative samples of the solid residue were collected and sent for gold assay. The final gold extraction was calculated based on the gold assay results of the residue and the head. The leaching curve was constructed using calculated values from the solution gold assay results.

First of all, a comparison was made among the cyanidation process, the ammoniacal thiosulfate leaching process, and the sodium thiosulfate leaching process using copper-diethylenetriamine complex (Cu-DETA) as a catalyst. All three tests were conducted at 25° C.

Before the cyanidation test, the sample was subjected to pre-leach oxidation for 3 hours at 25° C. Oxygen was injected to bring the dissolved oxygen (DO) within the 12-16 ppm range. The leaching conditions were as follows:
 NaCN at 1 g/L (the concentration was monitored and adjusted at each control point)
 pH at 10.6-11.4 (the pH value was monitored and adjusted by adding calcium hydroxide)
 Dissolved oxygen at 6-8 (no oxygen or air bubbling during leaching)
 Lead nitrate at 5 mmol/L (lead nitrate was added after the pre-leach as a concentrated solution).

Considering that the ammoniacal thiosulfate leaching process is capable of dissolving gold at low dissolved oxygen levels under quite reductive conditions, this test had no oxidative pre-leach stage. The leaching conditions are listed as follows:
 Ammonium thiosulfate at 200 mmol/L (the concentration was monitored and adjusted at each control point)
 Ammonia at 1000 mmol/L (the reactor was partially covered and no additional ammonia was added during the leach)
 Copper sulphate at 2 mmol/L
 pH at 10.1-9.9 (the pH value was monitored but not controlled)
 Dissolved oxygen at 0.2-0.4 ppm (the dissolved oxygen level was monitored but not controlled).

The sodium thiosulfate leaching used copper-diethylenetriamine complex (Cu-DETA) as the catalyst. The test had no pre-leach step. The leaching conditions were as follows.
 Sodium thiosulfate at 200 mmol/L (the concentration was monitored but not adjusted)
 Diethylenetriamine at 6 mmol/L
 Copper sulfate at 2 mmol/L
 pH at 9.9-10.2 (the pH value was monitored but not controlled)
 Dissolved oxygen at 1.6-6.3 ppm (the dissolved oxygen level was monitored but not controlled).

Figure 2:
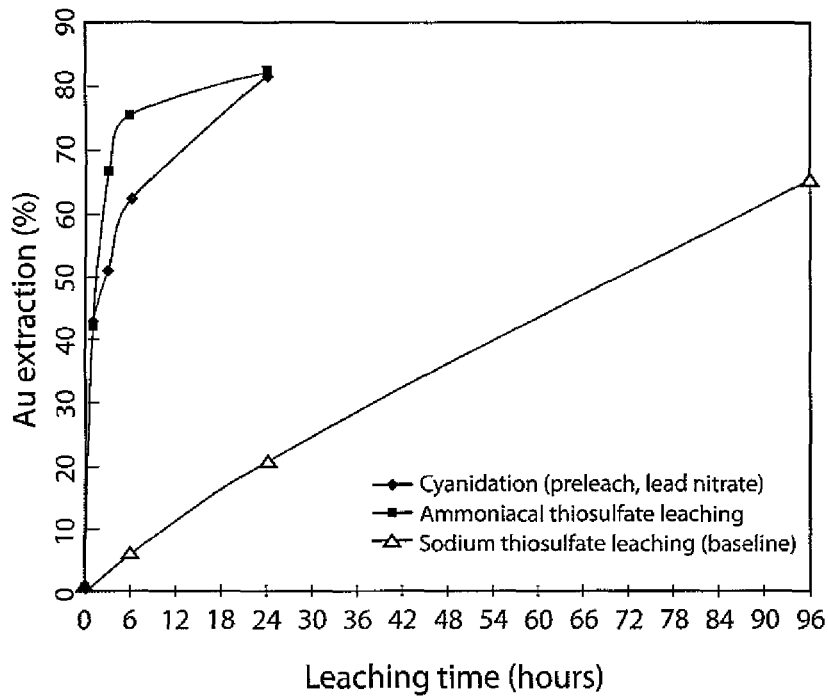
FIG. 2 is a graph showing a comparison of results of three gold leaching processes, i.e. cyanide leaching, ammoniacal thiosulfate leaching and sodium thiosulfate leaching (diamonds show cyanidation—preleach, lead nitrate, squares show ammoniacal thiosulfate leaching, and open triangles shown sodium thiosulfate leaching—baseline)

As shown in FIG. 2 of the accompanying drawings, both the cyanidation leaching process and the ammoniacal thiosulfate leaching process leached more than 81% of gold within 24 hours (when the process was stopped). The slope of the leaching curves between 6 and 24 hours indicated that the gold extraction may be further increased if the duration is extended to 48 hours. The reagent consumption for NaCN was 0.7 kg/tonne of ore. The total addition of NaCN was 2.8 kg/tonne. For the ammoniacal thiosulfate process, the reagent consumption was 34 kg/tonne. The ammoniacal thiosulfate leaching process had the fastest leaching kinetics. Without ammonia, the thiosulfate leaching with the copper-diethylenetriamine catalyst appeared to be very slow. It took 96 hours to extract 65.7% gold with this process. Nevertheless, the sodium thiosulfate consumption was reduced to 15.6 kg/tonne. Obviously, the baseline sodium thiosulfate leaching kinetics must be largely improved for the process to be competitive on a commercial scale. The following tests were carried out with this objective in mind.

By testing various leaching processes on a highly sulphidic gold ore (62.1% pyrite), it was shown that the cyanidation and the ammoniacal thiosulfate leaching processes had similar leaching rates and gold extractions (>81% in 24 hours). On the other hand, the sodium thiosulfate leaching process using a copper-catalyst was significantly slower and could only extract 65.7% gold in 4 days. The lack of an efficient secondary lixiviant and surface catalyst (i.e. free ammonia) is theorized to be the major reason for the slow kinetics. The worthiness of the sodium thiosulfate leaching process is in its low reagent consumption (i.e., sodium thiosulfate at 15 kg/tonne vs. ammonium thiosulfate at 34 kg/tonne).

Addition of Soluble Lead Salt

To improve the sodium thiosulfate gold leaching rate, 3 mmol/L lead nitrate was added as a concentrated solution into the slurry before the leaching step. The remaining leaching conditions were as follows:
 Sodium thiosulfate at 200 mmol/L (the concentration was monitored but not adjusted)
 Diethylenetriamine at 6 mmol/L
 Copper sulfate at 2 mmol/L
 pH at 9.27-10.13 (the pH value was monitored but not controlled)

Dissolved oxygen at 2.15-6.50 ppm (the dissolved oxygen level was monitored but not controlled)

Lead nitrate at 3 mmol/L (lead nitrate was added as a concentrated solution at hour zero).

Figure 3:
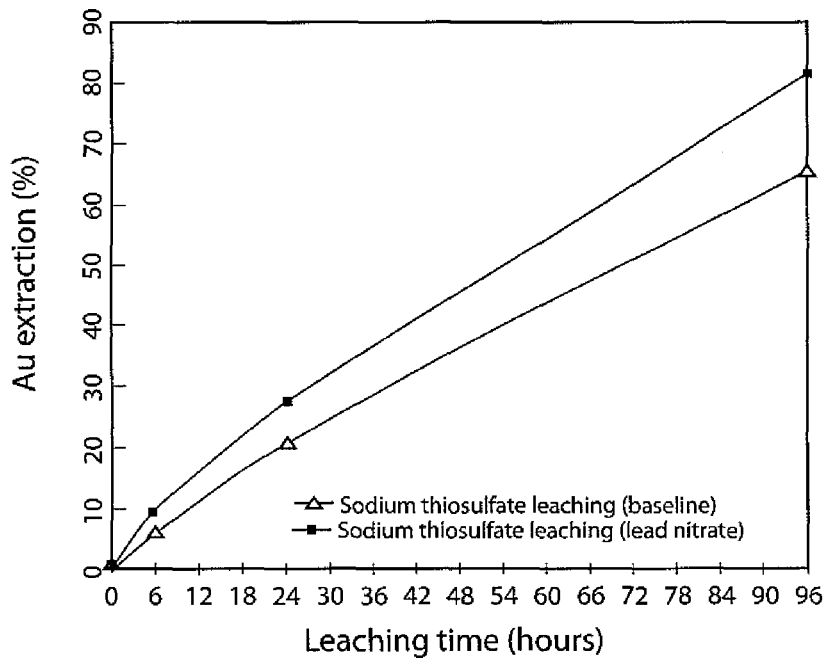
FIG. 3 is a graph showing an effect of lead nitrate on the leaching of gold using sodium thiosulfate and copper-diethylenetriamine catalyst (open triangles shown sodium thiosulfate leaching—baseline, squares show sodium thiosulfate leaching—lead nitrate)

As shown in FIG. 3 of the accompanying drawings, the addition of a soluble lead salt (lead nitrate) improved the overall gold leaching rate and the final gold extraction increased to 81.7%, which is comparable to that of the cyanidation and the ammoniacal thiosulfate leaching tests, although the required time was greater (96 hours). An amount of 12.3 kg/tonne sodium thiosulfate was consumed after 96 hours, which is lower than that consumed the baseline test. Thus, the positive effect of soluble lead (lead nitrate) on the leaching rate of sodium thiosulfate process was verified by these results.

Use of Thiourea

Figure 4:
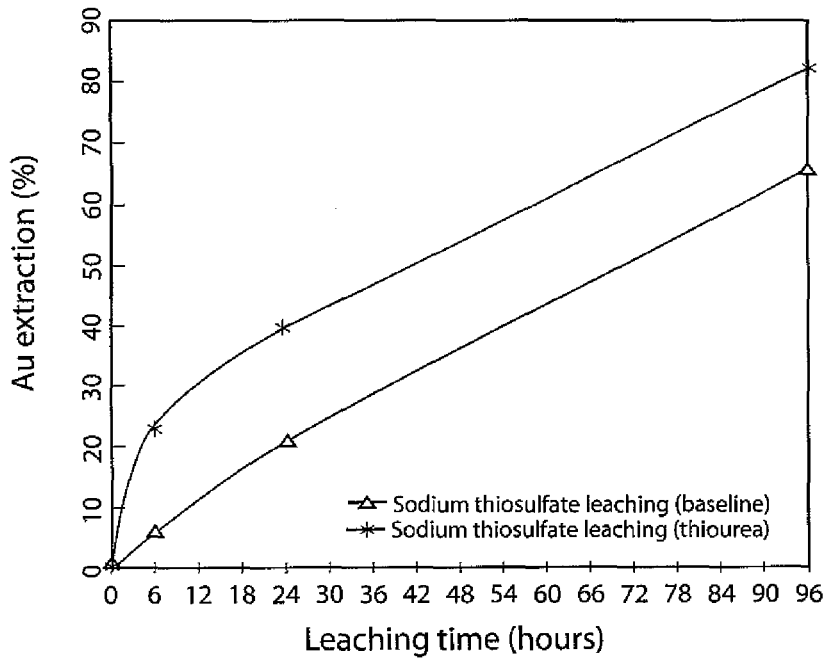
FIG. 4 is a graph showing an effect of thiourea on the leaching of gold using sodium thiosulfate and copper-diethylenetriamine catalyst (open triangles show sodium thiosulfate leaching—baseline, and stars show sodium thiosulfate leaching—thiourea)

The lack of a strong secondary lixiviant, such as ammonia, is theorized to be another main reason for the slow kinetics observed in the sodium thiosulfate leaching process. The effect of additions of thiourea, as a secondary lixiviant, on the leaching efficiency is shown in FIG. 4. The leaching conditions were as follows.

Sodium thiosulfate at 200 mmol/L (the concentration was monitored but not adjusted)
Diethylenetriamine at 6 mmol/L
Copper sulfate at 2 mmol/L
pH at 9.3-10.1 (the pH value was monitored but not controlled)
Dissolved oxygen at 2.2-6.5 ppm (the dissolved oxygen level was monitored but not controlled)
Thiourea at 15 mmol/L (thiourea was added as a concentrated solution at hour zero).

By adding 15 mmol/L thiourea, the 96 hours gold extraction increased to 82.1%. The benefit of thiourea appeared to be more significant during the first 6 hours. An amount of 15.2 kg/tonne sodium thiosulfate was consumed in this test. It should be noted that due to the interference of the thiourea (15 mmol/L), the titration result of thiosulfate could have been affected slightly.

Increase of Dissolved Oxygen

Even with the help of thiourea or lead nitrate, the sodium thiosulfate leaching process still needed 96 hours to complete substantial gold extraction. More efforts were made to further improve this process. Considering that the major characteristics of this ore sample is its high sulfide-containing pyrite and pyrrhotite concentration (62.1% and 3.7% by weight, respectively), the effect of oxygen injection on sodium thiosulfate leaching was studied.

Two tests were conducted using oxygen injection to increase the dissolved oxygen concentrations. Their leaching conditions are listed below.

Test without thiourea:
Dissolved oxygen at 12.5 ppm on average
Sodium thiosulfate at 200 mmol/L (the concentration was monitored but not adjusted)
Diethylenetriamine at 6 mmol/L
Copper sulfate at 2 mmol/L
pH at 9.8-10.4 (the pH value was monitored but not controlled).

Test with thiourea:
Dissolved oxygen at 12.5 ppm in average
Sodium thiosulfate at 200 mmol/L (the concentration was monitored but not adjusted)
Diethylenetriamine at 6 mmol/L
Copper sulfate at 2 mmol/L
pH at 9.3-9.5 (the pH value was monitored but not controlled)
Thiourea at 20 mmol/L (thiourea was added as a concentrated solution at hour zero).

Figure 5:
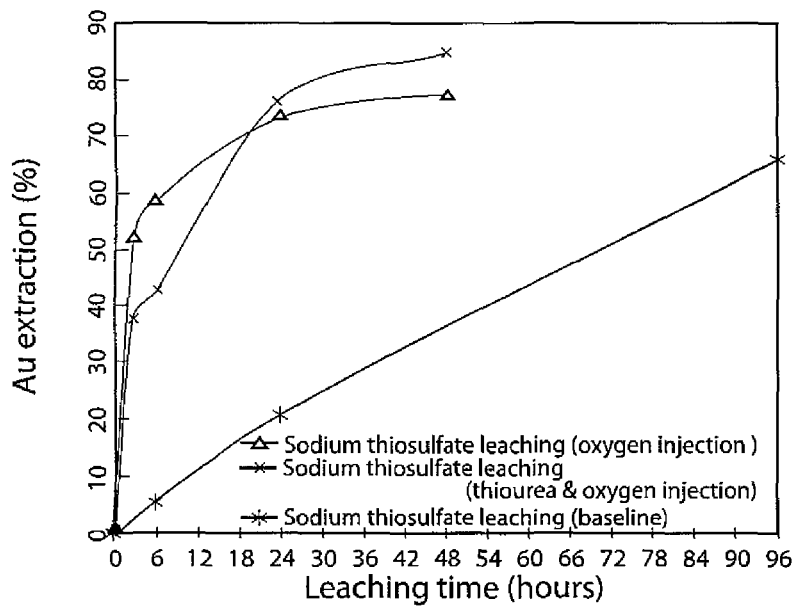
FIG. 5 is a graph showing an effect of oxygen injection on the leaching of gold using sodium thiosulfate and copper-diethylenetriamine catalyst (open triangles show sodium thiosulfate leaching—oxygen injection, crosses show sodium thiosulfate leaching—thiourea and oxygen injection; and stars show sodium thiosulfate leaching—baseline)

As shown in FIG. 5, at higher dissolved oxygen (DO) levels (12.5 ppm on average), the sodium thiosulfate gold extraction rates were significantly faster. Without thiourea, the final gold extraction reached 77.4% at 48 hours and 9.3 kg/tonne sodium thiosulfate was consumed in this test. In the presence of thiourea, the final gold extraction was 84.6% at 48 hours and the consumption of sodium thiosulfate was 17.3 kg/tonne. The elevation of oxidative conditions clearly improved the leaching rate for this highly sulphidic gold ore.

Increase of Reaction Temperature

An even more important factor affecting the leaching rate in sodium thiosulfate leaching was found to be the reaction temperature. In ammoniacal thiosulfate leaching, an elevated temperature has no significant effect on the leaching rate and sometimes its effect on leaching performance can even be negative. On the contrary, with an increase in temperature, the overall gold extraction rate of the sodium thiosulfate leaching process can be largely improved. Thus, two more leaching tests were conducted at 50° C. The leaching conditions are listed below.

Test without Thiourea
Sodium thiosulfate at 200 mmol/L (The concentration was monitored but not adjusted)
Diethylenetriamine at 6 mmol/L
Copper sulfate at 2 mmol/L
pH at 9.58-8.76 (The pH value was monitored but not controlled)
Dissolved oxygen at 0-1.65 ppm (no oxygen injection).

Test with Thiourea
Sodium thiosulfate at 200 mmol/L (The concentration was monitored but not adjusted)
Diethylenetriamine at 6 mmol/L
Copper sulfate at 2 mmol/L
pH at 9.29-9.45 (The pH value was monitored but not controlled)
Dissolved oxygen at 8.26-8.70 ppm (no oxygen injection)
Thiourea at 20 mmol/L (thiourea was added as a concentrated solution at hour zero).

Figure 6:
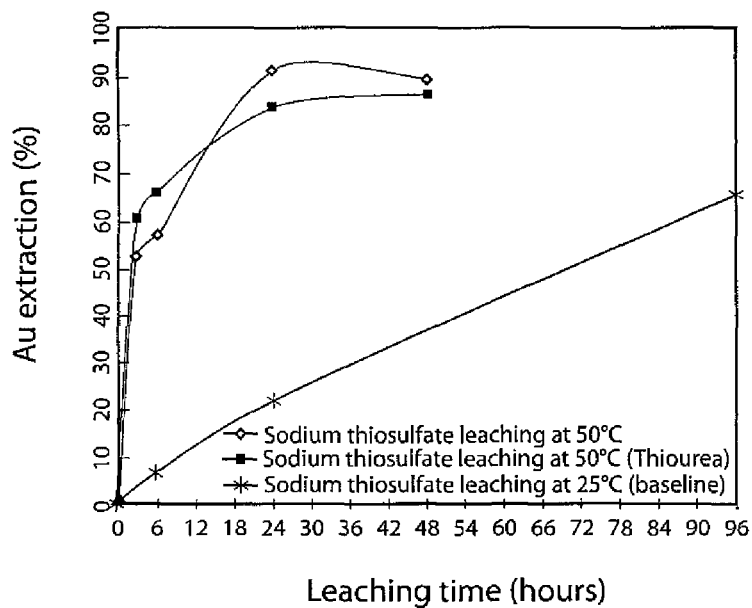
FIG. 6 is a graph showing an effect of elevated temperature on the leaching of gold using sodium thiosulfate and copper-diethylenetriamine catalyst (open diamonds show sodium thiosulfate leaching at 50° C., squares show sodium thiosulfate leaching at 50° C.—thiourea, and stars show sodium thiosulfate leaching at 25° C.—baseline)

As shown in FIG. 6 of the accompanying drawings, an elevated temperature (50° C.) accelerated the leaching of gold dramatically. Without thiourea, the gold extractions at 24 and 48 hours were 90.8% and 89.0%, respectively. An amount of 21.4 kg/tonne sodium thiosulfate was consumed after 48 hours. At 50° C., the leaching rate was as fast as that of cyanidation and the ammoniacal thiosulfate leaching.

In the presence of thiourea (20 mmol/L), the leaching rate in the first 6 hours was even higher. The overall gold extraction was 85.7% after 48 hours. The beneficial effect that thiourea had on the leaching kinetics appears to have been more significant in the early stage of leaching. In this test, 29.8 kg/tonne sodium thiosulfate was consumed after 48 hours of leaching.

The beneficial effect of an elevated temperature (50° C. in this case) on the sodium thiosulfate leaching efficiency was verified. However, it should be noted that at this temperature, the consumption of sodium thiosulfate also increased.

Example 2

A high-grade oxide gold ore (−10 mesh or 2 mm) was obtained. The sample was divided evenly into 1.88-kg lots. Each lot was mixed with 1000 mL water and ground in a rod mill using stainless steel rods for 38 minutes. The wet screening analysis showed the particle size was reduced from −10 mesh (2 mm) to 82.6%-200 mesh (74 μm) after grinding.

Table 4 lists all the reagents and chemicals used in this work. The additions of cyanide and calcium hydroxide were in their solid powder form. The rest chemicals were added in the form of concentrated solutions.

TABLE 4

Chemicals and reagents

| Formula | Chemical Names | Abbreviations | Purity |
|---|---|---|---|
| $Na_2S_2O_3 \cdot 5H_2O$ | sodium thiosulfate pentahydrate | STS | 100.2% |
| $(NH_4)2S_2O_3$ | ammonium thiosulfate | ATS | 99% |
| $Ca(OH)_2$ | calcium hydroxide | | 99% |
| KI | potassium iodide | | 99% |
| $I_2$ | Iodine | | 99.8% |
| $CuSO_4 \cdot 5H_2O$ | copper sulfate pentahydrate | | 99% |
| $AgNO_3$ | silver nitrate | | 99% |
| $H_2SO_4$ | sulfuric acid | | 95% |
| $NH_3$, $(NH_4OH)$ | ammonia, ammonium hydroxide | | 28-30% |
| $C_4H_{13}N_3$ | diethylenetriamine | DETA | 99% |
| NaCN | cyanide, sodium cyanide | | 95% |

The mineralogical analysis shows that this sample contains mainly quartz, feldspar, and dolomite. The sulfide contents are in minor to trace level. Gold occurs mainly as native metal or electrum. The chemical constituents of this ore are shown in Table 5.

TABLE 5

Chemicals constituents

| Elements | Approx. Conc. wt % |
|---|---|
| Si | 24.5 |
| Al | 6.11 |
| Fe (ttl) | 4.62 |
| Ca | 4.60 |
| K | 4.45 |
| Mg | 2.56 |
| C (ttl) | 2.44 |
| Na | 1.49 |
| S (ttl) | 1.17 |
| Ti | 0.38 |
| Ba | 0.18 |
| P | 0.16 |
| Mn | 0.09 |

The gold grade was analyzed by an external assay laboratory in triplicate. The result indicated a gold grade of 19.1 g/t in average. Silver grade was low, averages at 3.9 g/t. Thus, this example did not cover the leaching of silver.

Glass reactors used for the leaching test were placed in a water bath for controlling the reaction temperature. A Teflon® stirrer connected with an overhead mixer provided sufficient agitation power. The acceptable rotation speed for this ore was from 400 rpm to 450 rpm. The slurry pulp density was approximately 33.3% solids (375 grams solid with 750 mL solution). To compensate for the evaporation loss of water, the weight of slurry was adjusted back to a normal level at each control point. Slurry pH, dissolved oxygen (DO) concentration, thiosulfate concentration, cyanide concentration and reaction temperature were monitored during the test. The concentration of thiosulfate was obtained real time with an altered iodine/iodide titration method. Cyanide concentrations were determined with silver nitrate titrations. The reagent concentration and slurry pH were adjusted when necessary. A small portion of the slurry was taken and filtered for collecting 10 mL solution sample. It was then sent to an external commercial laboratory for gold assays. At the end of each test, the whole slurry was filtered. The filter cake was washed twice and dried in an oven. Two representative portions of the solid residue were collected and sent to the external laboratory for gold assays. The final gold extraction was calculated based on the gold assay results of the residue and the head. The leaching curve was calculated from the solution gold assay result.

Three leaching tests were conducted at a mildly elevated temperature (50° C.). The result was compared with a cyanidation tests conducted at 25° C. A non-ammoniacal leaching baseline test was also carried out using sodium thiosulfate at 200 mmol/L, DETA at 6 mmol/L and copper sulfate at 2 mmol/L. The pH was monitored but not controlled. The slurry temperature was controlled in a water bath at 50° C. The first test had no additives. Seven mmol/L lead nitrate was added to the slurry in the second test and 50 mmol/L thiourea was added in the third test. The results are shown in FIG. 7 of the accompanying drawings.

Figure 7:
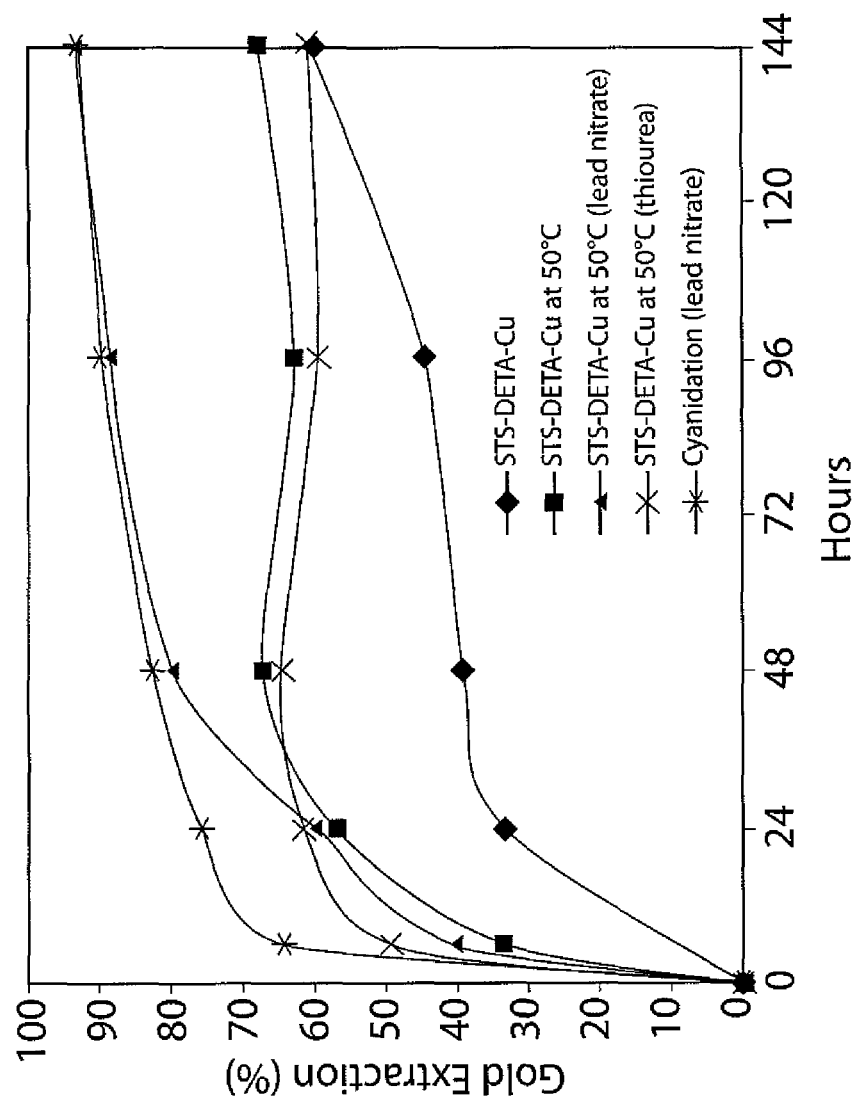
FIG. 7 is a further graph showing effects of elevated temperature on the leaching with additions of thiourea and lead nitrate (diamonds show sodium thiosulfate leaching with DETA and Cu, squares show sodium thiosulfate leaching with DETA and Cu at 50° C., triangles show sodium thiosulfate leaching with DETA and Cu at 50° C. with lead nitrate, crosses show sodium thiosulfate leaching with DETA and Cu at 50° C. with thiourea, and stars show cyanidation with lead nitrate).

As shown in FIG. 7, the leaching rates of the non-ammoniacal processes were largely enhanced by elevating the temperature from 25° C. to 50° C. The gold extraction was increased from 60.4% to 68.2% in the baseline test (without additive). The shape of the leaching curve of the baseline test at 50° C. suggested that passivation occurred on the gold surface and it became so significant at 48 hours that there was no further increase in gold extraction after 48 hours. Adding thiourea in the non-ammoniacal test at 50° C. had a much faster early leaching rate, but failed to introduce improvement to the final gold extraction with only 61.1% gold was leached after 144 hours. However, adding lead nitrate at 50° C. resulted in the most significant improvement on the leaching performance. The leaching rate approached that of the ambient temperature lead-enhanced cyanidation process with the final gold extraction boosted to 94.0%, which is slightly higher than the cyanidation result (93.5%). The presence of lead nitrate obviously counteracted the passivation of gold in the non-ammoniacal thiosulfate process and allowed further dissolution of gold after 48 hours.

The long leaching time suggested that the tested ore was a difficult ore possibly with coarse gold grains. The addition of lead or thiourea was beneficial with improvements on the leaching rate of the non-ammoniacal processes under ambient conditions. By elevating the temperature from 25° C. to 5° C., higher leaching rates were observed. The best non-ammoniacal leaching result was obtained by adding 7 mmol/L lead nitrate at 50° C.

The invention claimed is:

1. A method of extracting one or more precious metals from a precious metal-containing material, comprising the steps of:
    leaching a precious metal-containing material with a substantially cyanide-free and ammonia-free aqueous lixiviant containing dissolved thiosulfate, copper, a lead compound and an organic compound that serves as a copper ligand, thereby to form a leachate; and
    extracting the precious metal from the leachate;
    wherein the lead compound is present in the lixiviant at a concentration in a range of 0.01 to 10 mM at any point within the leaching step.

2. The method of claim 1, wherein the lead compound is present in the lixiviant in the form of a soluble lead salt.

3. The method of claim 1, wherein the lixiviant additionally contains thiourea.

4. The method of claim 3, wherein the thiourea is present in the lixiviant at a concentration of 5 to 300 mM at any point within the leaching step.

5. The method of claim 1, wherein an amount of dissolved oxygen in the lixiviant is increased above a normal level caused by gas-liquid interchange under open air conditions.

6. The method of claim 5, wherein the amount of dissolved oxygen is increased above a level of about 9 ppm.

7. The method of claim 1, wherein the leaching step is carried out at a temperature above ambient temperature up to the boiling point of the lixiviant under ambient atmospheric pressure.

8. The method of claim 1, wherein the precious metal-containing material contains copper and at least some of the copper in the lixiviant is derived from the copper in the material as the leaching step proceeds.

9. The method of claim 1, wherein the concentration of thiosulfate present in the lixiviant is in a range of 10 to 500 mM.

10. The method of claim 1, wherein the organic compound that serves as a copper ligand is a compound selected from the group consisting of polyamines, amino acids, ethanol amines and organic compounds that have amino group(s) that can serve as copper ligands.

11. A method of extracting at least one precious metal from a precious metal-containing material, comprising the steps of:
    leaching a precious metal-containing material with a cyanide-free and substantially ammonia-free aqueous lixiviant containing dissolved thiosulfate, copper, thiourea and an organic compound that serves as a copper ligand, thereby to form a leachate; and
    extracting the precious metal from the leachate.

12. The method of claim 11, wherein the thiourea is present in the lixiviant at a concentration in a range of 5 to 300 mM at any point within the leaching step.

13. The method of claim 11, wherein the lixiviant additionally contains a soluble lead compound.

14. The method of claim 13, wherein the soluble lead compound is present in the lixiviant at a concentration of 0.01 to 10 mM at any point within the leaching step.

15. The method of claim 11, wherein the amount of dissolved oxygen in the lixiviant is increased above a natural level caused by gas-liquid interchange under open air conditions.

16. The method of claim 15, wherein the amount of dissolved oxygen is increased to above about 9 ppm.

17. The method of claim 11, wherein the leaching step is carried out at a temperature above ambient temperature up to the boiling point of the lixiviant under ambient atmospheric pressure.

18. The method of claim 11, wherein the precious metal-containing material contains copper and at least some of the copper in the lixiviant is derived from the copper in the material as the leaching step proceeds.

19. The method of claim 11, wherein the concentration of thiosulfate present in the lixiviant is in the range of 10 to 500 mM at any point within the leaching step.

20. The method of claim 11, wherein the organic compound that serves as a copper ligand is a compound selected from the group consisting of polyamines, amino acids, ethanol amines and organic compounds that have amino group(s) that can serve as copper ligands.

21. A method of extracting at least one precious metal from a precious metal-containing material, comprising the steps of:
    leaching a precious metal-containing material with a substantially cyanide-free and ammonia-free aqueous lixiviant containing dissolved thiosulfate, copper and an organic compound that serves as a copper ligand, thereby to form a leachate; and
    extracting the precious metal from the leachate;
    wherein the lixiviant is provided with a dissolved oxygen content above a natural level produced by gas-liquid interchange under open air conditions; wherein the amount of dissolved oxygen is increased to about 9 ppm or higher.

22. The method of claim 21, wherein a soluble lead compound is present in the lixiviant.

23. The method of claim 22, wherein the lead compound is present in the lixiviant at a concentration in a range of 0.01 to 10 mM at any point within the leaching step.

24. The method of claim 21, wherein the lixiviant additionally contains thiourea.

25. The method of claim 24, wherein the thiourea is present in the lixiviant at a concentration in a range of 5 to 300 mM at any point within the leaching step.

26. The method of claim 21, wherein the leaching step is carried out at a temperature above ambient temperature up to the boiling point of the lixiviant under ambient atmospheric pressure.

27. The method of claim 21, wherein the ore contains copper and at least some of the copper in the lixiviant is derived from the copper in the precious metal-containing material as the leaching step proceeds.

28. The method of claim 21, wherein the concentration of thiosulfate present in the lixiviant is in a range of 10 to 500 mM at any point within the leaching step.

29. The method of claim 21, wherein the organic compound that serves as a copper ligand is a compound selected from the group consisting of polyamines, amino acids, ethanol amines and organic compounds that have amino group(s) that can serve as copper ligands.

* * * * *